US006209678B1

(12) United States Patent
Sterling

(10) Patent No.: US 6,209,678 B1
(45) Date of Patent: Apr. 3, 2001

(54) PNEUMATIC HAND TOOL EXHAUST MUFFLER

(76) Inventor: Robert E. Sterling, P.O. Box 2822, Spokane, WA (US) 99220

( * ) Notice: Subject to any disclaimer, the term of this patent is extended or adjusted under 35 U.S.C. 154(b) by 0 days.

(21) Appl. No.: 09/431,294

(22) Filed: Oct. 29, 1999

(51) Int. Cl.[7] .................................................. F01N 3/02
(52) U.S. Cl. ........................................ 181/230; 181/258
(58) Field of Search ................................ 181/229, 230, 181/243, 252, 256, 258, 282; 173/DIG. 2; 55/276

(56) References Cited

U.S. PATENT DOCUMENTS

| | | |
|---|---|---|
| 3,526,293 | 9/1970 | Hayes et al. . |
| 3,667,571 | 6/1972 | Fattleay . |
| 3,675,732 | 7/1972 | Rosen et al. . |
| 3,719,251 * | 3/1973 | Fedrick ............................ 181/230 |
| 3,811,251 | 5/1974 | Gibel . |
| 3,880,245 | 4/1975 | Anderson, Jr. . |
| 3,880,252 | 4/1975 | Mucka . |
| 3,896,897 | 7/1975 | Hilbush, Jr. . |
| 4,082,160 | 4/1978 | Schilling et al. . |
| 4,134,472 | 1/1979 | Trainor . |
| 4,184,564 | 1/1980 | Trainor . |
| 4,205,732 | 6/1980 | Auerbach et al. . |
| 4,258,798 | 3/1981 | Campbell et al. . |
| 4,565,259 | 1/1986 | Stoll . |
| 5,097,924 | 3/1992 | Reeves . |
| 5,418,339 | 5/1995 | Bowen et al. . |
| 5,500,494 | 3/1996 | Ligman . |
| 5,767,459 * | 6/1998 | Sell ...................................... 181/230 |

FOREIGN PATENT DOCUMENTS

| | | |
|---|---|---|
| 1.519.853 | 7/1968 | (FR) . |
| 2.570.759 | 3/1986 | (FR) . |

* cited by examiner

*Primary Examiner*—Khanh Dang
(74) *Attorney, Agent, or Firm*—Christensen O'Connor Johnson Kindness PLLC

(57) ABSTRACT

A muffler for quieting exhaust expelled from a pneumatic hand tool having a handle and an exhaust passage. The muffler includes an inner tube having a plurality of holes, a number of dividers fixedly and spacedly positioned about the inner tube, and an end cap attachable to the handle for closing off the exhaust passage. At least one of the end cap and the handle including an exit opening. The inner tube has distal and proximal ends and an exterior surface. A cutoff wall is located below at least one airflow opening. The cutoff wall forces exhaust air to exit the inner tube via the at least one airflow opening thereabove. Each divider extends outward from the inner tube exterior surface a distance less than the width of the main section. The combination of the inner tube and dividers are located within the main section. During hand tool use, exhaust air enters the inner tube proximal end, flows out the inner tube holes, moves around the number of dividers, and flows out the exit opening, the cutoff wall forcing exhaust air to exit the inner tube. The tortuous movement of the exhaust air slows it and assists in dampening any attendant noise. Alternative embodiments include an outer tube.

13 Claims, 15 Drawing Sheets

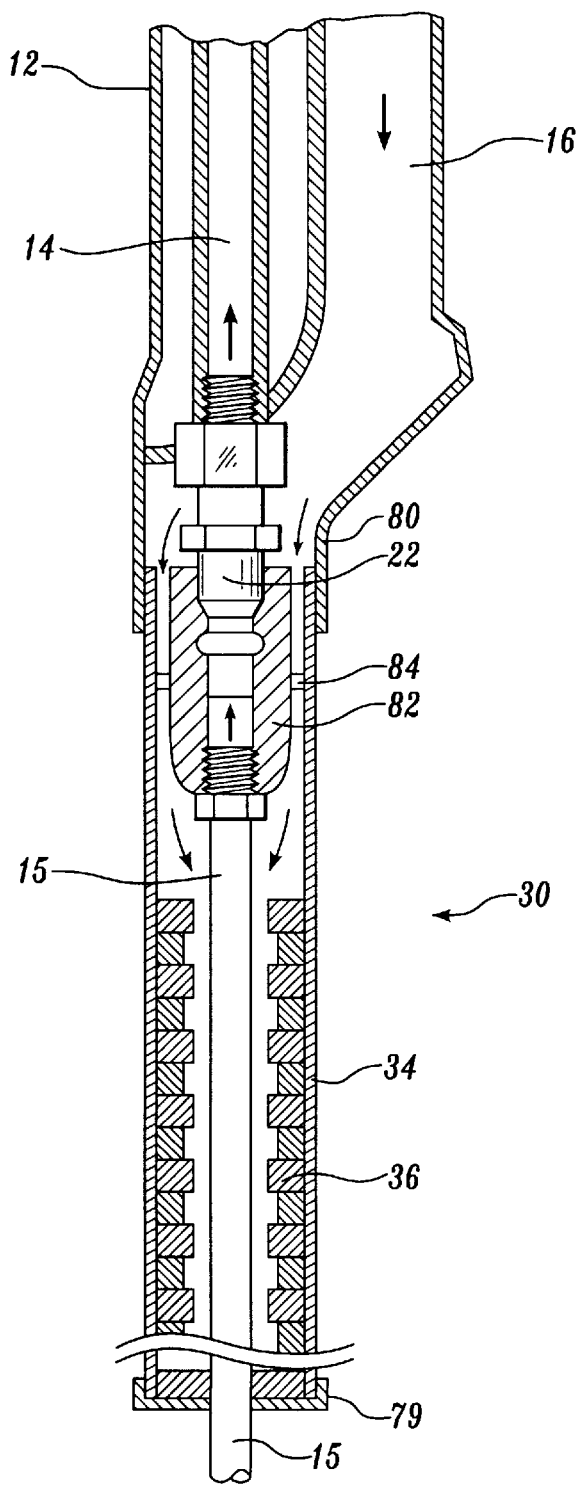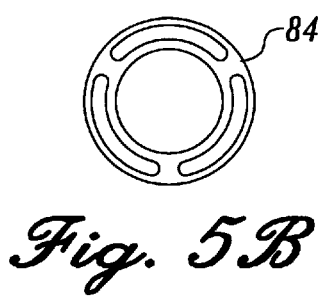
Fig. 5B
Fig. 5A

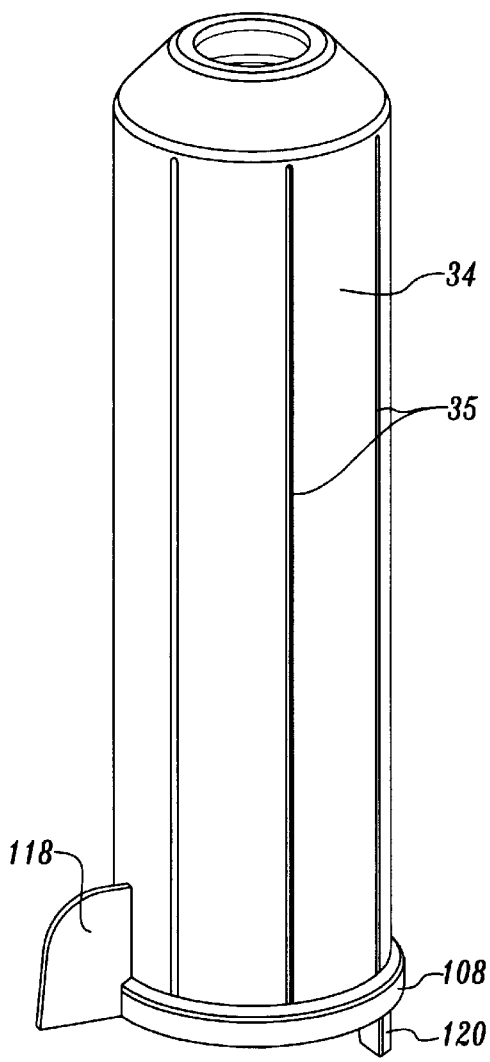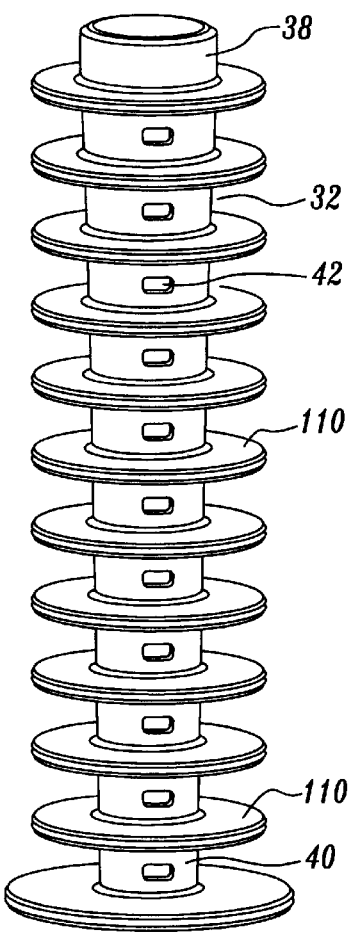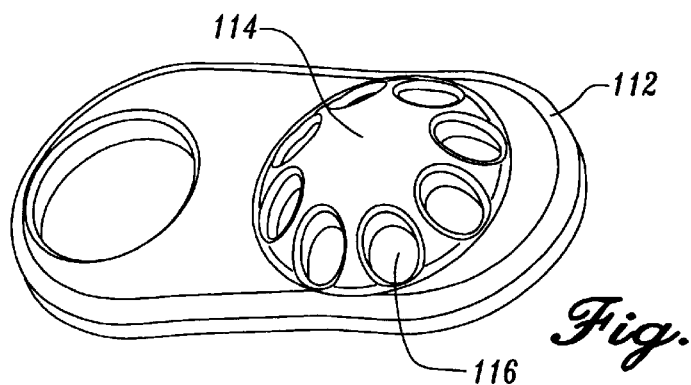
Fig. 7C.
Fig. 7D.
Fig. 7E.

PNEUMATIC HAND TOOL EXHAUST MUFFLER

REFERENCE TO RELATED APPLICATION

This application is a continuation-in-part of U.S. application Ser. No. 09/316,451 filed May 21, 1999, now abandoned which is a continuation of U.S. Pat. No. 5,909,016 filed May 19, 1998, which was a continuation-in-part of U.S. Pat. No. 5,952,623 filed Jan. 13, 1998.

FIELD OF THE INVENTION

The present invention relates to acoustics and sound modifying means for muffling and filtering air, and more particularly to devices for muffling and filtering air exhausted from pneumatically-operated hand tools, equipment, machines, and the like.

BACKGROUND OF THE INVENTION

Pneumatic hand tools are commonly used in industrial and residential settings. Various types of pneumatic hand tools are available, including ratchets, drills, wrenches, grinders, sanders, etc. Known hand tools typically include a handle having a hollow internal chamber. The chamber includes an air intake passage and an air exhaust passage. Each passage extends between a motor and an opening in the bottom surface of the handle. The portion of the intake passage located near its respective handle opening includes components adapted to connect to a standard air coupler or the like. The coupler is in communication with a pressured air supply source. The exhaust passage opens to the atmosphere. When exhaust air is vented from the hand tool, a considerable amount of noise and particulate debris is generated, potentially causing auditory and/or respiratory damage to the operator and others located nearby.

Although ear plugs and face masks are available to workers, they are often not used for a number of reasons—most typically because they are not convenient. Numerous attempts have been made by hand tool manufacturers, therefore, to reduce the amount of noise and particles generated by the hand tool itself. These attempts include designing quieter and cleaner motors and designing hand tool components that suppress noise and trap waste prior to expulsion from the hand tool. For example, U.S. Pat. No. 5,418,339 describes a pneumatic hand tool having an exhaust port filled with a web of non-woven fibers coated with a binder resin. These types of mufflers have had some success in muffling sound, but there is often an increase in back pressure to the motor causing a decrease in the operating efficiency of the hand tool. The operating efficiency of a tool is typically measured in the operating speed of the motor in revolutions per minute (rpm) at a certain gauge pressure.

Cylindrical canister-type combination muffler and air filters are known for large machines, such as hoists and presses. For example, U.S. Pat. No. 4,134,472 describes a combination muffler and air filter having a central tubular member with a number of slots. The tubular member is surrounded by a disposable canister having inner and outer perforated rigid cylinders encasing a series of stacked annular filter members. Exhaust air passes through the inner cylinder, into the filters, and out the outer cylinder. These devices are not typically used for hand tools, however, because of they are large, heavy, and difficult to maneuver.

Thus, there exists a need for a noise muffling system that can reduce sound levels and remove entrained solid and liquid contaminates from the exhausted air before it is discharged to the atmosphere. The ideal device would effectively muffle and filter the exhaust air without creating substantial amounts of back pressure. This would allow a hand tool to be operated without jeopardizing performance of the pneumatic tool over long periods of usage. The ideal muffling system would further attach to a hand tool body and remain attached even during significant tool vibrations. In addition, it would be desirable to have a muffler that can be easily attached to existing pneumatic hand tools. The present invention is directed to fulfilling these needs and others as described below.

SUMMARY OF THE INVENTION

In accordance with aspects of the present invention, a muffler improvement for quieting exhaust expelled from a pneumatic hand tool is provided. The hand tool has a handle with an exhaust passage including a main section. The muffler includes an inner tube having distal and proximal ends and a plurality of holes. A cutoff wall is located below at least one hole in the inner tube. The cutoff wall forces exhaust air to exit the inner tube via the at least one hole located thereabove. The muffler further includes a number of dividers fixedly and spacedly positioned about the inner tube. Each divider extends outward from the inner tube exterior surface a distance less than the width of the main section. The combination of the inner tube and dividers is located within the main section. An end cap is attachable to the handle for closing off the exhaust passage. At least one of the end cap and the handle includes an exit opening. During hand tool use, exhaust air enters the inner tube proximal end, flows out the inner tube holes, moves around the number of dividers, and flows out the exit opening. The tortuous movement of the exhaust air slows it and assists in dampening any attendant noise.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5A is a cross-sectional side view of a fifth embodiment muffler formed in accordance with the present invention;

FIG. 5B is a plan view of the distancing washer shown in FIG. 5A;

FIG. 7C is a perspective view of the outer tube used in the embodiment of FIG. 7A;

FIG. 7D is a perspective view of the inner tube used in the embodiment of FIG. 7A;

FIG. 7E is a perspective view of the end cap used in the embodiment of FIG. 7A;

DETAILED DESCRIPTION OF THE PREFERRED EMBODIMENT

The present invention is a muffler for use in quieting exhaust expelled from a pneumatic hand tool. The present invention is compact, lightweight, and easy to use. In select embodiments, the muffler is adapted for immediate connection to known pneumatic hand tools, with only minimal changes required to the hand tool. A number of embodiments of the present invention are described below with reference to the accompanying drawings. It should be appreciated that these embodiments are provided to illustrate various features of the present invention, and thus should not be viewed as limiting with regard to the specific combination of their configurations.

Figure 1:
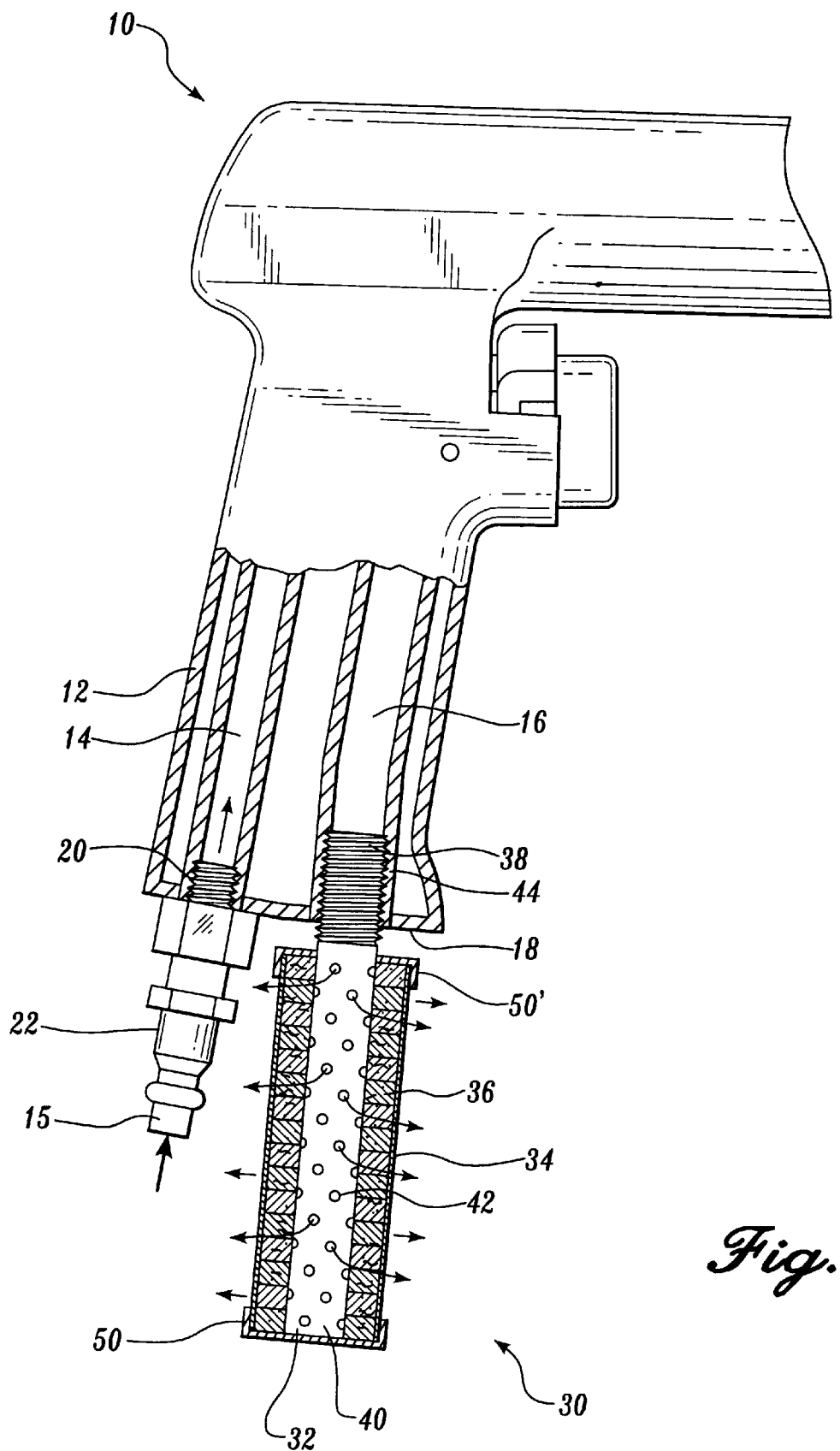
FIG. 1 is a partial cross-sectional side view of a first embodiment muffler formed in accordance with the present invention.

Referring to FIG. 1, a pneumatic hand tool 10 generally includes a handle 12 within which an air intake passage 14 and an air exhaust passage 16 extend to and end at respective openings in the bottom surface 18 of the handle. The air intake passage opening includes threads 20 adapted to connect to an air supply line 15 via a standard air coupler 22 or the like. The supply line 15 is in communication with a pressured air supply source (not shown.) A muffler formed in accordance with the present invention connects to the exhaust passage 16 using any one of a number of means, depending on the handle configuration of the tool.

Shown in FIG. 1 is a first embodiment of a muffler 30 formed in accordance with the present invention. FIG. 1 is a partial cutaway drawing. The muffler 30 includes an inner tube 32 having proximal and distal ends 38, 40, an outer sleeve or tube 34, and a number of washers 36. In FIG. 1 at the location of the muffler 30, the inner tube 32 is shown in side view, not cross-section. Each washer is preferably circular with a centered circular inner hole. The inner tube 32 is positioned within the area defined by the stacked washer inner holes. The inner tube 32 is formed from a relatively lightweight rigid material e.g., plastic, metal alloys, steel, etc. The inner tube 32 includes a plurality of holes 42 distributed about the inner tube along its longitudinal length. In the embodiment of FIG. 1, the inner tube proximal end 38 includes outer threads 44 adapted to screw into corresponding threads formed in the exhaust passage 16 near the exhaust opening. Other known attachment means, however, may be used, e.g., adhesive, latches, clamps, snaps, bolts, crosspins, etc.

Still referring to FIG. 1, the washers 36 are similarly sized to one another and are positioned side-by-side so that their inner holes are aligned. The inner tube 32 is located within the area defined by the aligned washer holes. The number of washers 36 extends the length of the inner tube for which there are holes 42. The washers 36 are made of a suitable sound dampening and/or filtering material such as felt, gauze, rubber, foam, fiber, synthetics, etc. The washers should be of a density sufficient to dampen noise, but not dense enough to cause a significant back pressure in the exhaust passage 16. An exemplary high density felt washer that has yielded good results is manufactured by All Felt Products of Engleside, Ill., product number F-1 S.A.E. During testing, this washer decreased the noise level by approximately 15 decibels, while causing a back pressure of less than about 2.5 psi as measured in a standard pneumatic hand tool. In addition, the washers preferably include mold and moisture-resisting chemicals.

Figure 2A:
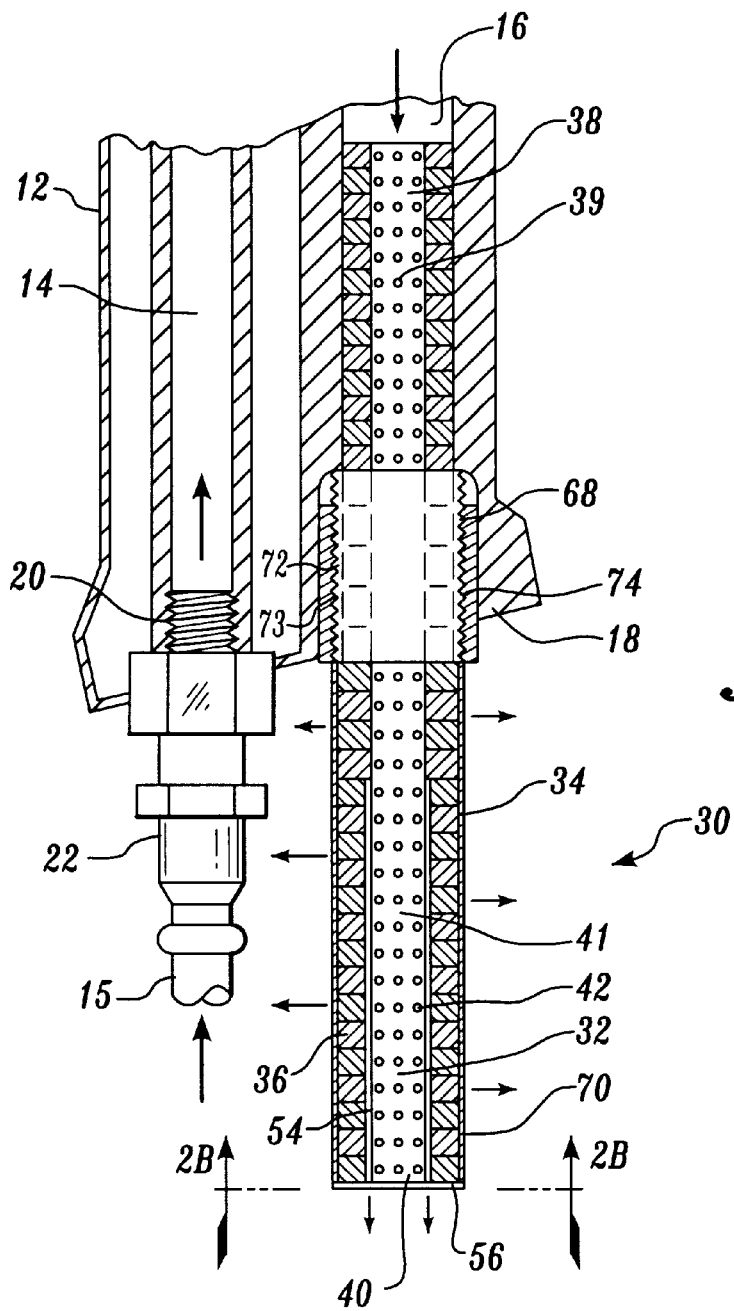
FIG. 2A is a partial cross-sectional side view of a second embodiment of a muffler formed in accordance with the present invention.

As shown in FIGS. 1, 3, and 4, the washer inner hole diameters are all the same size, and the washer outer diameters are all the same size. In general, a muffler formed in accordance with the present invention may include washers of various inner and outer diameters. For example, the configurations of FIGS. 2A and 5A show washers of like outer diameters and varying inner diameters. In addition, the washers may be of varying densities and/or thickness'. The size, density, and arrangement of the washers will affect the rate at which the exhaust air is slowed and hence will effect exhaust noise and back pressure. Accordingly, a designer should carefully consider the number, size, density, material, and placement of the washers 36 in the muffler.

The combination of washers 36 and inner tube 32 is located within the outer sleeve 34. Referring back to the embodiment of FIG. 1, the outer sleeve 34 is sized to contact the outer perimental surfaces of the washers. In some embodiments, the outer sleeve 34 is formed from a lightweight flexible fabric that includes air passages. Example flexible materials include loose-knit or woven nylon fabric, canvas, polyester, wool, perforated flexible plastic, perforated tape, other synthetic fabrics, perforate sealant, etc. Other embodiments use an outer tube formed from a rigid or semi-rigid material, e.g., plastic, metal, thick paper, thick foil, etc.

Still referring to FIG. 1, the washers extend along the inner tube between the tube distal end and the inner tube location adjacent the proximal end threads. A lower seal or cap 50 closes off the inner tube distal end 40 and the last washer which is positioned at the distal end. An upper seal or cap 50' closes off the end washer near the proximal end. Although the caps 50, 50' may be flexible or rigid, they do not allow airflow therethrough in the embodiment of FIG. 1. During use, exhaust air enters the inner tube proximal end 38 from the exhaust passage 16, travels down the inner tube and outward through the inner tube holes and into the washers. At the washers 36, the exhaust is slowed and the exhaust noise is consequently reduced. The exhaust air then travels radially out the washers and through the outer sleeve 34 air passages and to the atmosphere. As will be appreciated from viewing FIG. 1, the caps 50, 50' on the first and last washers force the exhaust air to travel radially outward through the washers.

Figure 2B:
FIG. 2B is a plan view of a lower cap shown in FIG. 2A.

Shown in FIGS. 2A and 2B is a second embodiment of a muffler 30 formed in accordance with the present invention. FIG. 2A is also a partial cutaway drawing. At the location of the handle 12 and the muffler 30, the inner tube 32 and the components labeled 56 and 72 are shown in side view, not in cross-sectional side view. Similar to the first embodiment, the second embodiment also includes an inner tube 32 having proximal and distal ends 38, 40, and a plurality of holes 42 therethrough. The muffler 30 further includes a first portion 39 and a second portion 41. The first portion 39 is located near the inner tube proximal end 38. The second portion 41 is located near the distal end 40. The holes 42 are located at least along the length of the inner tube second portion 41. The first portion is surrounded by a plurality of similarly-sized stacked circular washers 36. The combination of the first portion and its respective washers is positionable within the exhaust passage 16 via the exhaust opening. The outer diameters of these washers are preferably sized to contact the surface of the exhaust passage inside the handle.

The second portion 41 is surrounded by washers and an outer sleeve 34. The outer sleeve includes first and second ends 68, 70. The outer sleeve first end 68 is located between the proximal and distal inner tube ends 38, 40. The outer sleeve second end 70 is located near the inner tube distal end 40. The outer sleeve first end 68 is formed as a rigid annular member 72 that includes a threaded outer surface 73. As shown in FIG. 2A, the handle exhaust opening is modified to include mating threads 74 adapted to engage the outer sleeve first end threaded outer surface 73. The mating threads 74 may be formed from a nut that is inserted in the exhaust opening, formed integrally at the exhaust opening during manufacture of the handle, formed at the opening after formation of the handle, or formed using any other methods available for creating threading. The mating threads of FIG. 2A are provided by a cylindrical nut that is glued, cemented, or heat welded to an existing handle exhaust opening. What is important to the second embodiment of the present invention is that the nut be securely attached to the handle so that it will not move during use of the hand tool.

Still referring to FIG. 2A, washers 36 of differing densities are arranged alternatingly along the inner tube 32. In addition to density variations, some of the washers along the inner tube second portion have a larger inner diameter than other of the washers. This provides a passage 54 for exhaust air to travel in addition to passage out the washers. The second embodiment muffler includes a perforated lower end cap 56 shown in plan view in FIG. 2B. The perforated lower cap includes a ring of holes 58 positioned to align with the passage 54 during use.

Figure 3A:
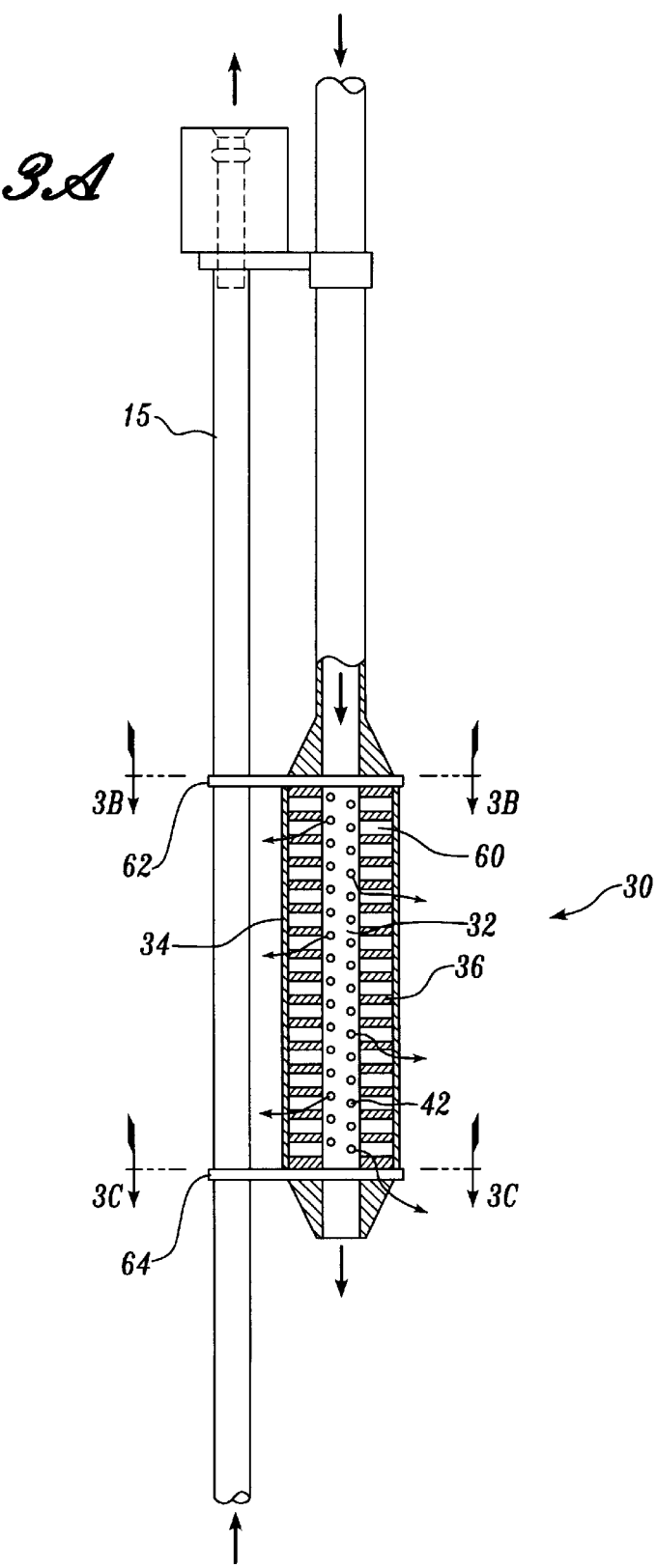
FIG. 3A is a cross-sectional side view of a third embodiment of a muffler formed in accordance with the present invention.
Figure 3B:
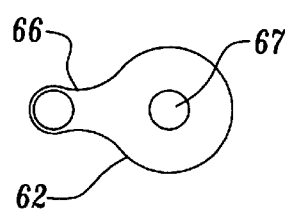
FIGS. 3B and 3C are plan views of upper and lower fittings shown in FIG. 3A.
Figure 3C:
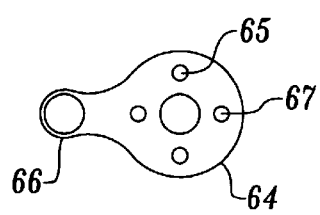

A third embodiment of a muffler 30 formed in accordance with the present invention is shown in FIGS. 3A–3C. FIG. 3A is a partial cutaway drawing. At the location of the muffler 30, the inner tube 32 and the components labeled 62 and 64 are shown in side view, not in cross-sectional side view. Referring particularly to FIG. 3A, this embodiment is similar to the first embodiment except that the inner tube is of a significantly longer length so that the inner tube holes and washers are correspondingly located farther from the hand tool 10. In addition, longitudinal spaces 60 are left between the washers. This arrangement provides noise reduction with even less amounts of back pressure than in either the first or second embodiments.

Upper and lower support fittings 62, 64 are used to cap the first and last washers. Both the upper and lower support fittings 62, 64 include a central hole 67 through which the inner tube 32 extends. Both fittings 62, 64 additionally include an arm 66 adapted to attach to an air supply line 15. The attachment to the supply line helps to steady and support the muffler during use. As shown in FIG. 3B, the upper support fitting 62 completely prohibits airflow to or from the muffler. As shown in FIG. 3C, the lower support fitting 64 includes a number of openings 65 that allow airflow therethrough.

Figures 4A, 4B:
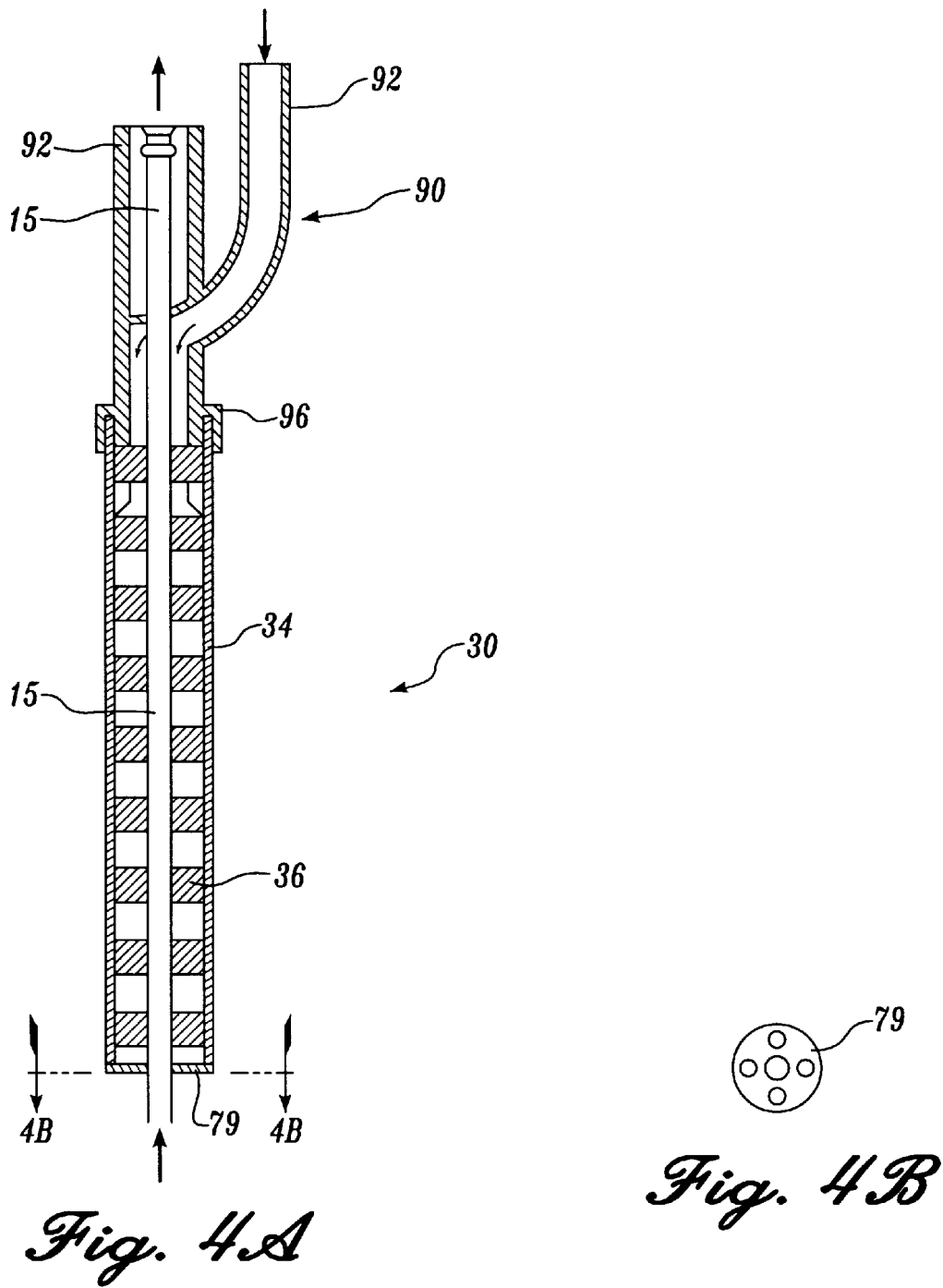
FIG. 4A is a cross-sectional side view of a fourth embodiment of a muffler formed in accordance with the present invention.
FIG. 4B is a view of an end cap taken along lines 4B—4B of FIG. 4A.

Fourth and fifth embodiments of a muffler 30 formed in accordance with the present invention are shown in FIGS. 4 and 5. These embodiments further stabilize the muffler 30 by forming the muffler about the supply line 15. In the fourth embodiment of FIGS. 4A and 4B, the handle exhaust opening is separate from the intake opening, similar to the handle configuration shown in FIG. 1. In the fifth embodiment of FIGS. 5A and 5B, the handle is formed to cause the exhaust passage 16 to surround the air intake passage 14. In general, both the fourth and fifth muffler embodiments include a perforate outer sleeve 34 surrounding a plurality of washers 36. There is no inner tube, instead the washers 36 are disposed about the air supply line 15. The muffler is closed at its distal end using a sealant or capping means 79 that may include perforations, depending on the flow requirements of a particular application.

Referring to FIGS. 4A and 4B, a Y-shaped attachment piece 90 is provided to connect the supply line 15 and muffler 30 with the air intake passage 14 and the exhaust passage 16, respectively. The Y-shaped attachment piece has an input arm 92 and an output arm 94 that connect directly to a standard coupler 22 and the exhaust passage 16 at the handle, respectively. The output arm 94 connects with the input arm 92 and surrounds it to form a single combined arm 96. The outer sleeve and washer components attach to the combined arm 96, with the supply line 15 passing through the washer inner holes. Referring to the embodiment of FIGS. 5A and 5B, the supply line 15 is connected to the intake passage 14 via a standard coupler 22. A portion 80 of the handle exhaust passage is formed to envelop the intake opening and portions of the coupler 22. The muffler proximal end is adapted to connect to this exhaust passage portion 80. The muffler proximal end includes a coupler mating piece 82 and a rigid distancing washer 84. The mating piece 82 is held in the outer sleeve 34 by the distancing washer 84. The coupler mating piece 82 receives the standard coupler 22 at one end and connects to the air supply line 15 at the other end. The coupler mating piece 82 is of a smaller outer diameter so exhaust air is forced to pass around it and the supply line 15 and into the muffler washers 36.

Figure 6A:
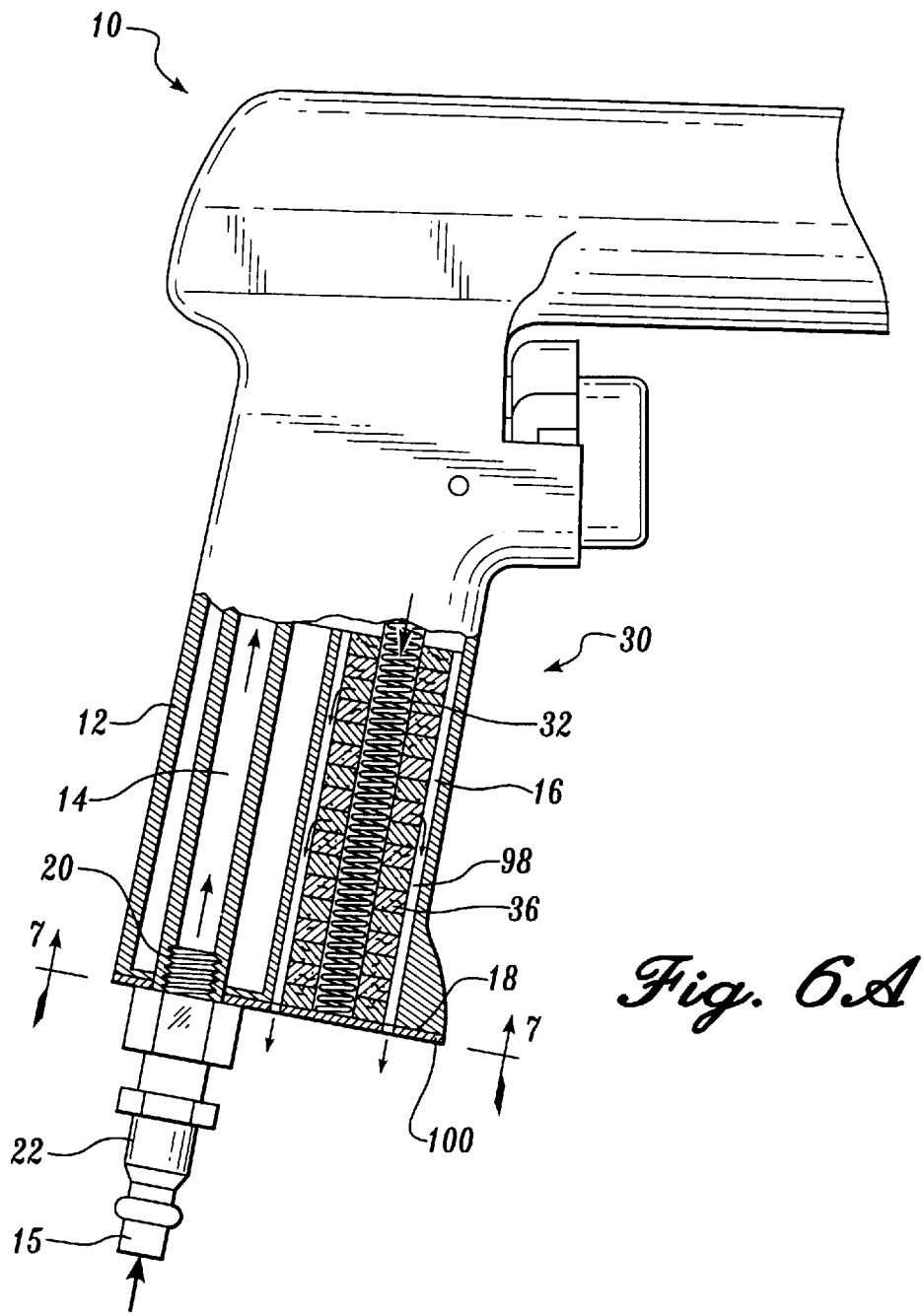
FIG. 6A is partial cross-sectional side view of a sixth embodiment of a muffler formed in accordance with the present invention.
Figure 6B:
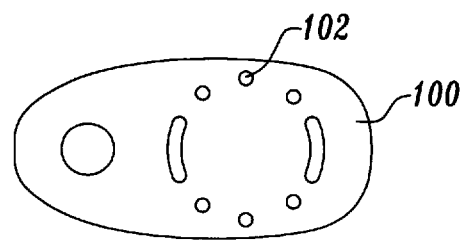
FIG. 6B is a plan view of a lower cap taken along lines 6B—6B of FIG. 6A.

Shown in FIGS. 6A and 6B is a sixth embodiment of a muffler formed in accordance with the present invention. The muffler includes an inner tube 32 and a number of washers 36. The inner tube 32 is preferably formed as a spring. FIG. 6A is a partial cutaway drawing. At the location of the muffler, the inner tube 32 is shown in side view, not in cross-sectional side view. The inner tube 32 is positioned within the area defined by the stacked washer inner holes. When using a spring inner tube, the coil thickness and the number of coils per a given length can be tailored to give a particular desired air flow rate. The spring inner tube may be in compression, in tension, or otherwise unloaded. What is important to the present invention is the airflow rate ensuing from the spring, not necessarily the capability of the spring. Therefore, other spring-like shapes may be used.

In the embodiment of FIG. 6A, the combination of washers and inner tube are inserted directly into the air exhaust passage 16. The interior surfaces of the handle exhaust passage act as an outer tube. The washers are sized to provide an airflow passage 98 between the peripheral edge surfaces of the washers and the air exhaust passage side wall surfaces. An end cap 100 is provided to close off the exhaust passage at the handle bottom surface 18. The cap 100, shown in FIG. 6B, includes one or more openings 102 through which exhaust gas may exit the hand tool. It is preferable, that the cap 100 does not include openings that align directly with the inner tube so that exhaust gas will pass from the inner tube laterally outward through the washers before exiting the tool. During use, exhaust air passes from the tool through the inner tube 32, out the washers, and through the passage 98 to the openings 102 in the end cap 100.

Figures 7A, 7B:
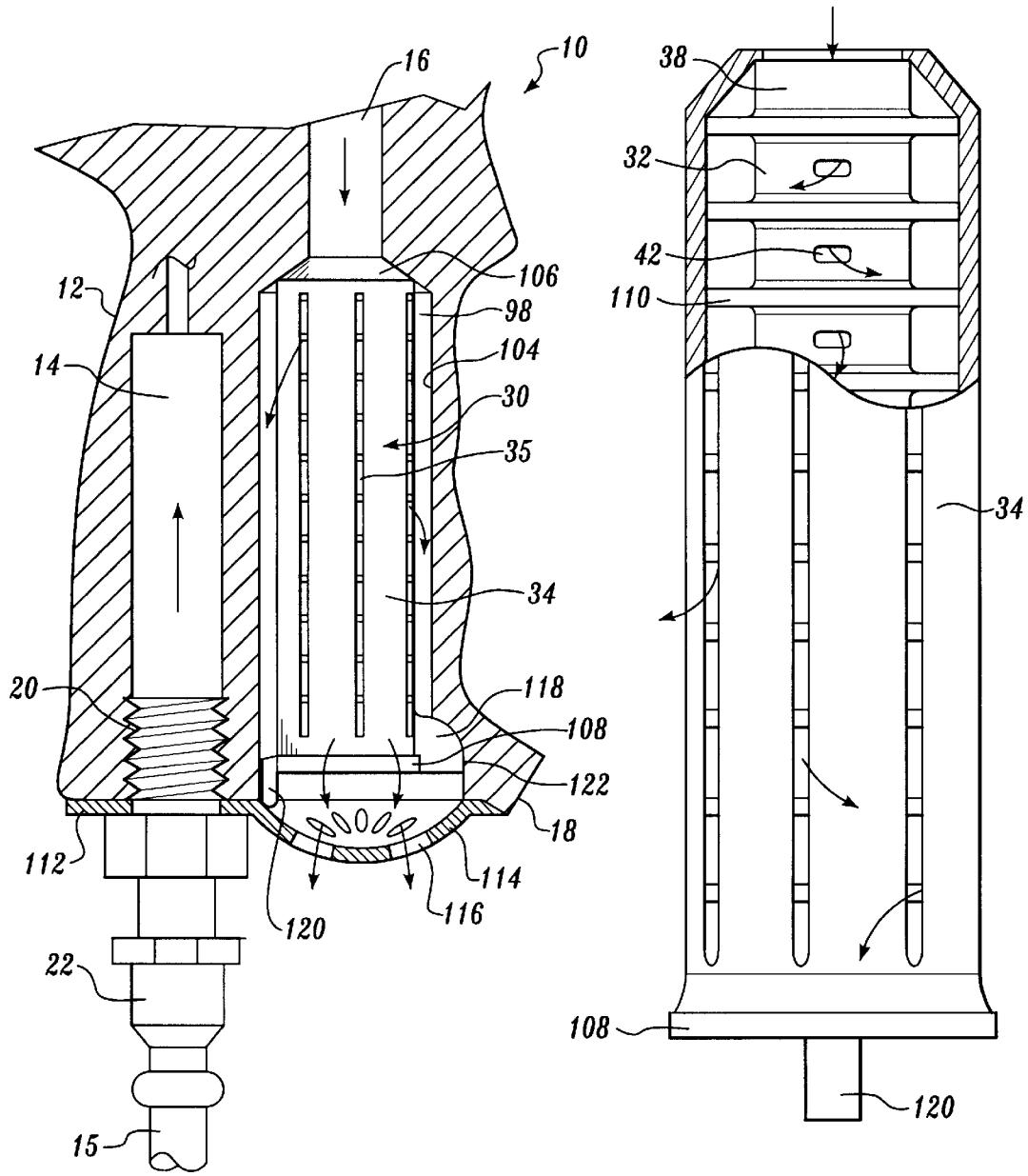
FIG. 7A is a partial cross-sectional side view of a seventh embodiment of a muffler formed in accordance with the present invention.
FIG. 7B is a partial cross-sectional side view of muffler components used in the embodiment of FIG. 7A.
Figure 8:
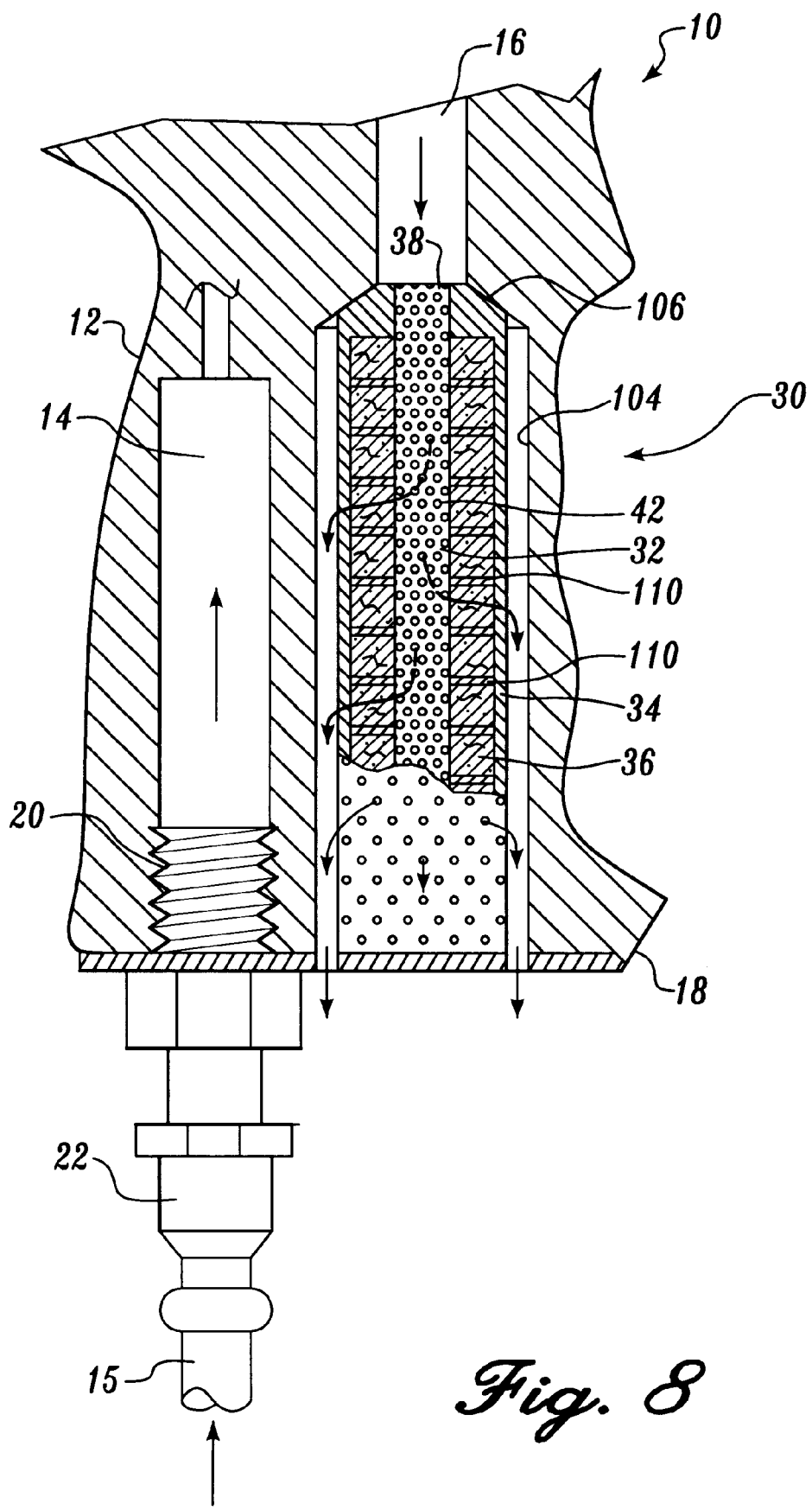
FIG. 8 is a partial cross-sectional side view of an eight embodiment of a muffler formed in accordance with the present invention.
Figures 9A, 9B:
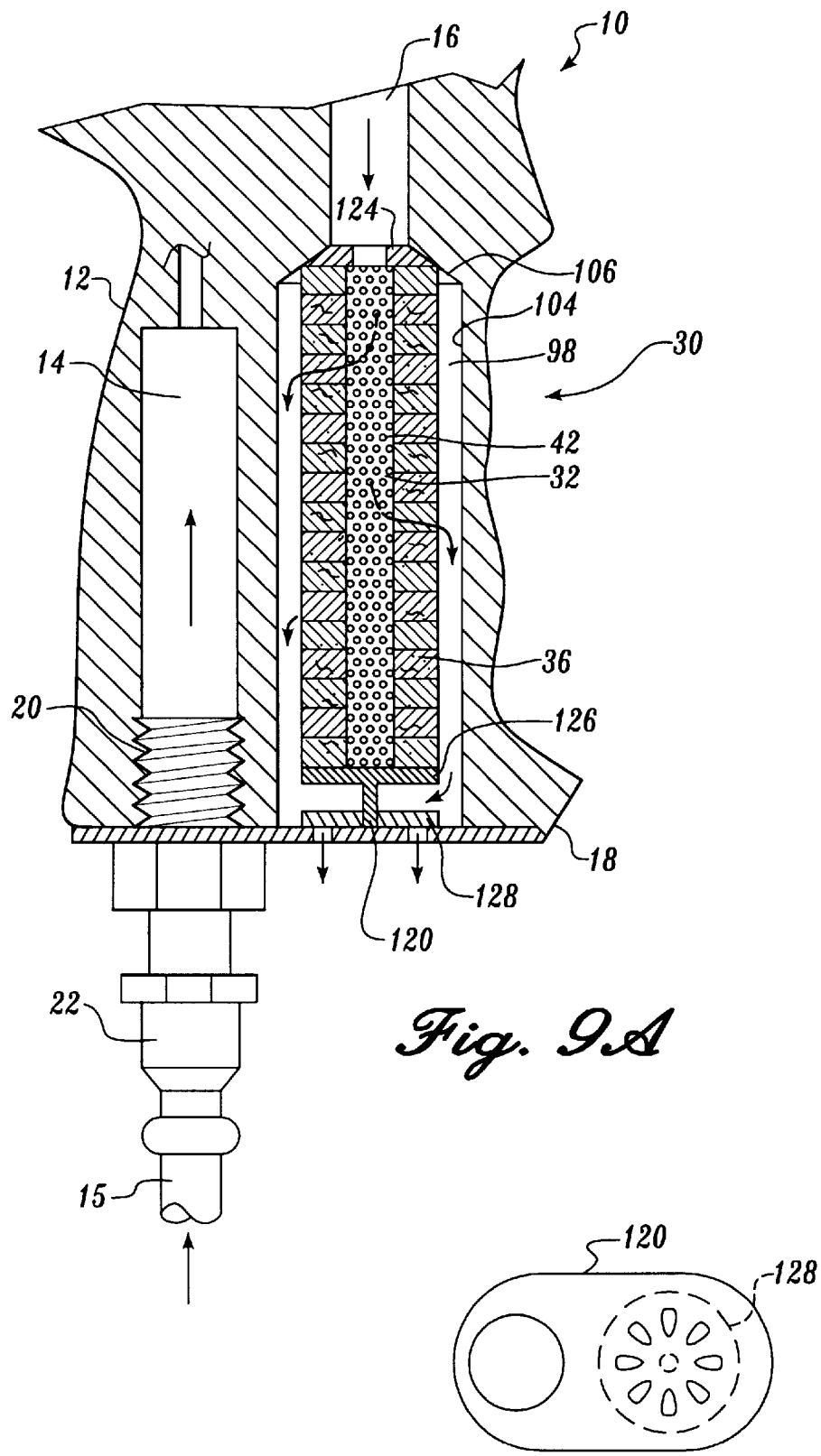
FIG. 9A is a partial cross-sectional side view of a ninth embodiment of a muffler formed in accordance with the present invention.
FIG. 9B is a plan view looking up of the end cap in FIG. 9A.
Figure 10:
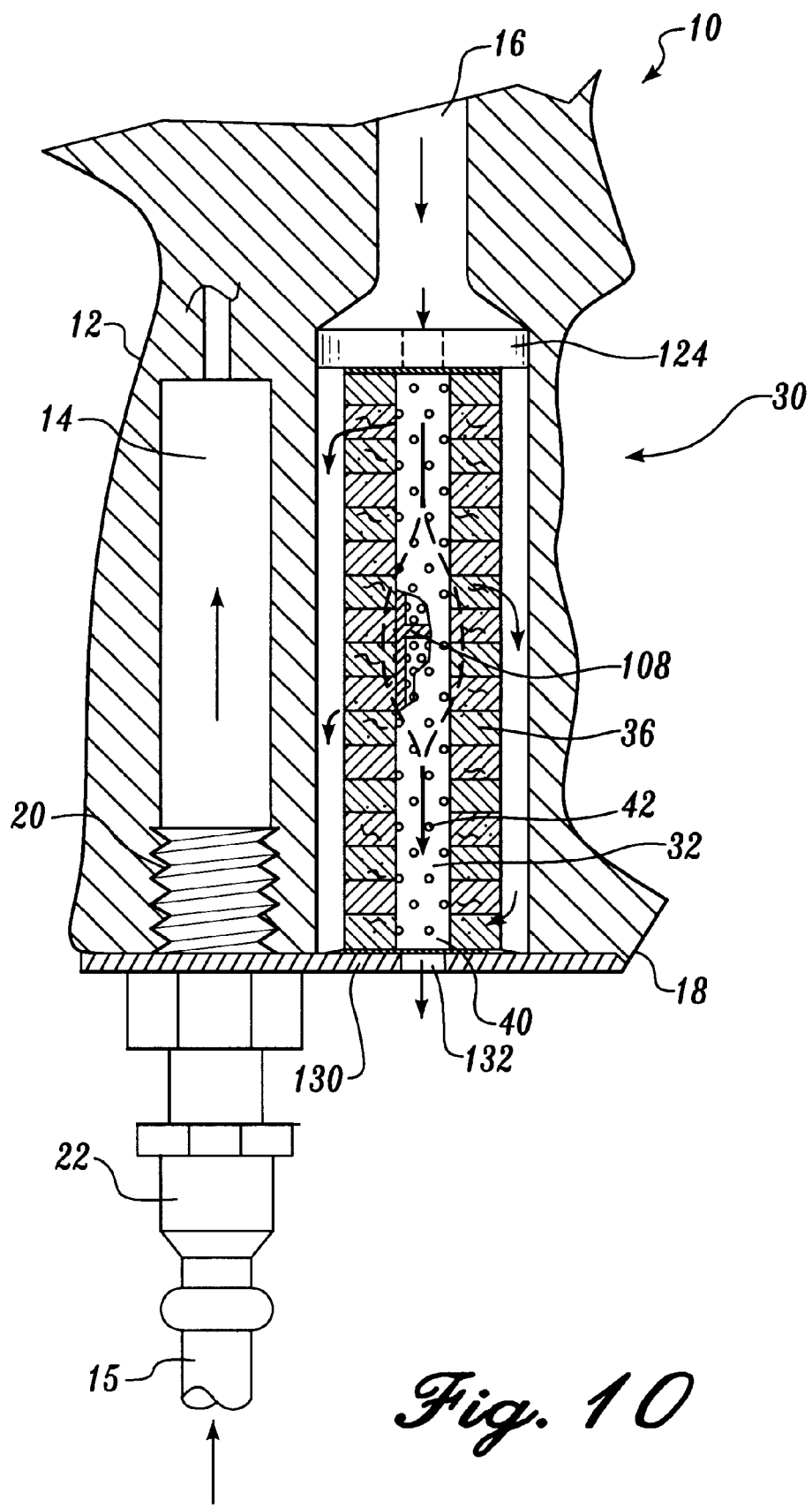
FIG. 10 is a partial cross-sectional side view of a tenth embodiment of a muffler formed in accordance with the present invention.
Figure 11A:
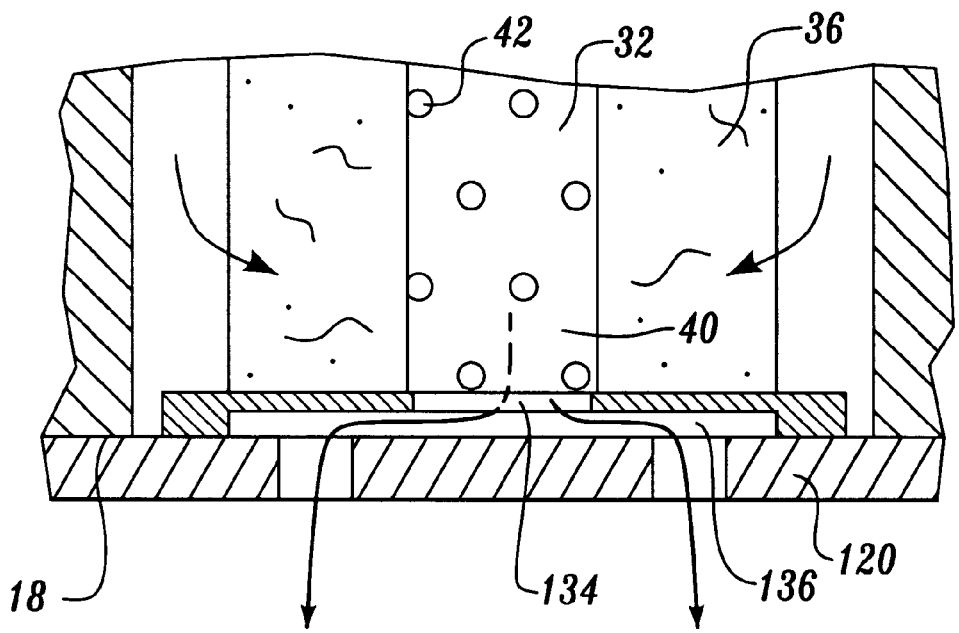
FIG. 11A is a cross-sectional side view of an alternative end cap arrangement formed in accordance with the present invention.
Figure 11B:
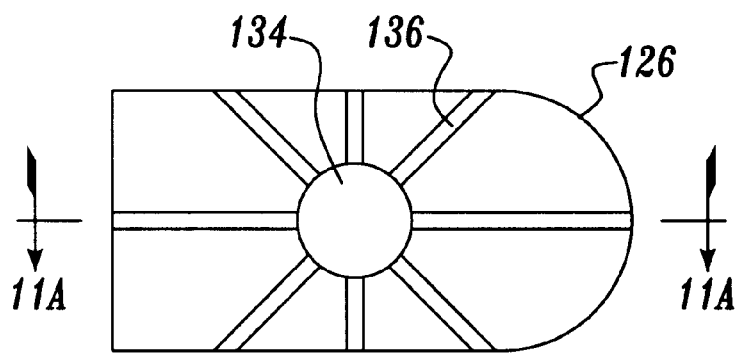
FIG. 11B is a plan view looking up of the end cap of FIG. 11A.
Figure 12:
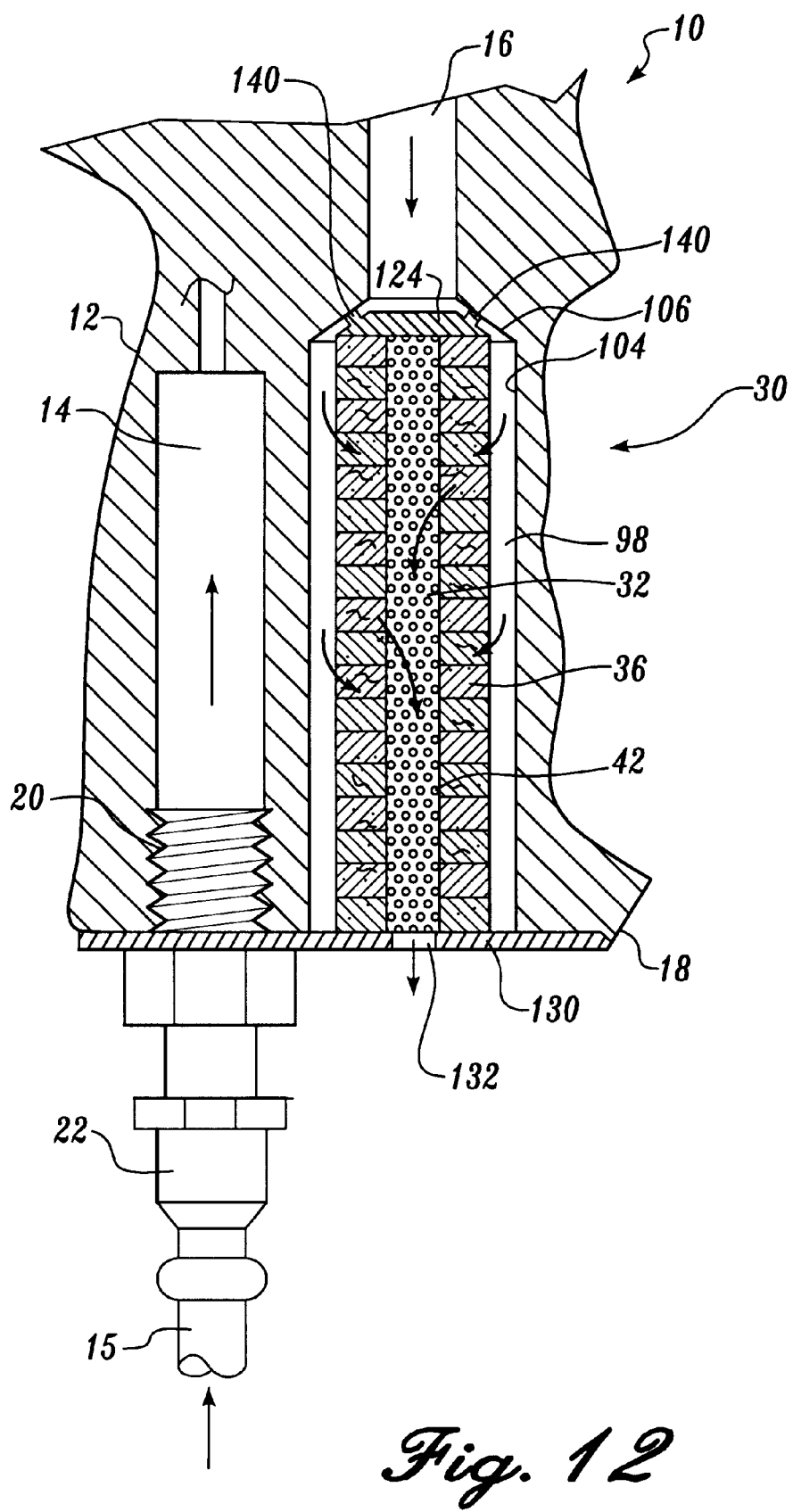
FIG. 12 is a partial cross-sectional side view of a twelfth embodiment of a muffler formed in accordance with the present invention.
Figure 13:
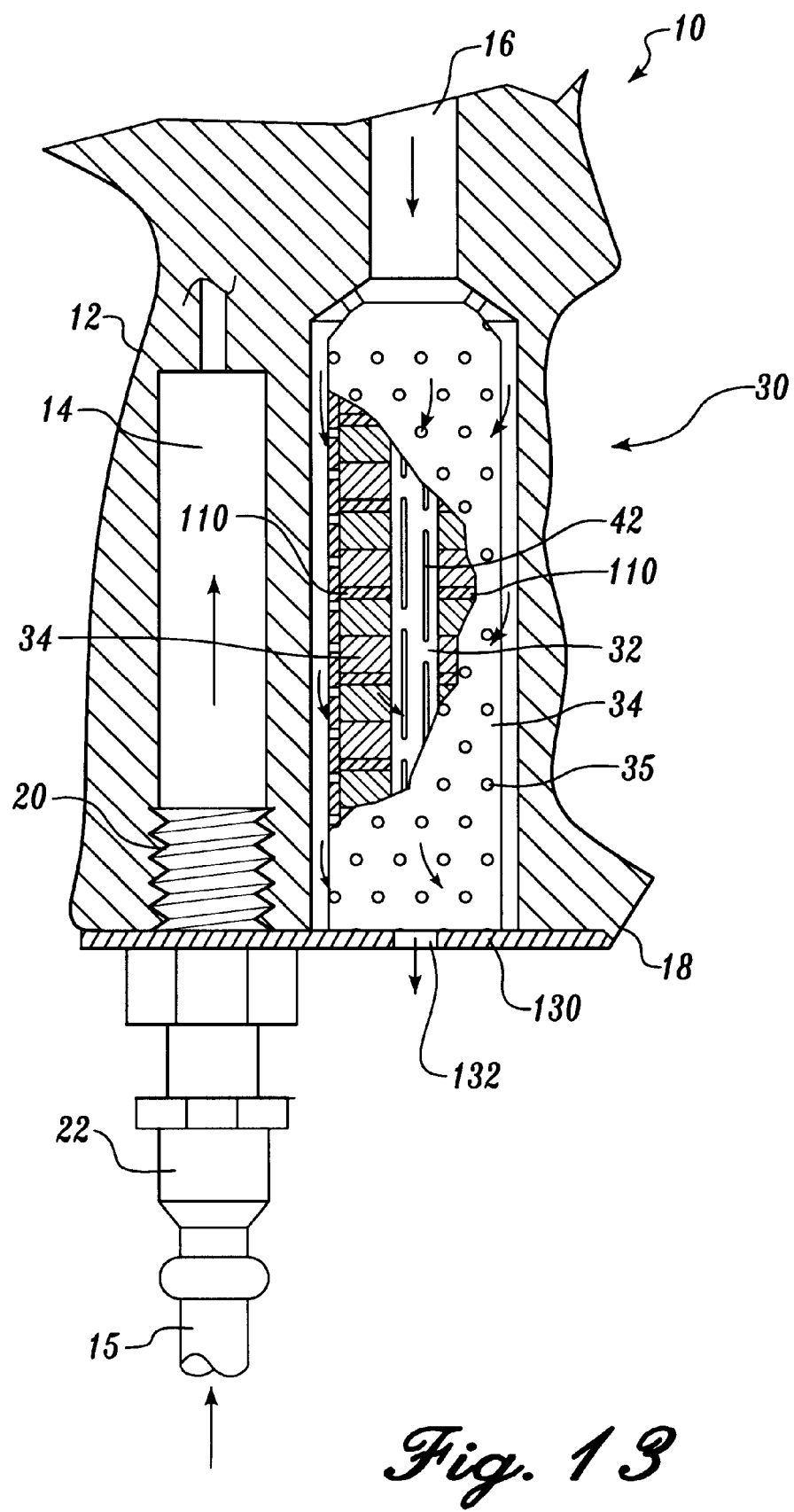
FIG. 13 is a partial cross-sectional side view of a thirteenth embodiment of a muffler formed in accordance with the present invention.

FIGS. 7A, 8, 9A, 11, 12, 13, and 14 illustrate further variations of mufflers formed in accordance with the present invention. FIGS. 7A, 8, and 9A are "outward" flow arrangements in that they accept exhaust air at an inner tube proximal end and force the air to flow outward in order to discharge from the muffler. FIGS. 11A, 12, and 13 are "inward" flow arrangements in that they force exhaust air inward into the inner tube and out the inner tube distal end in order to discharge from the muffler. FIG. 10 is a combination arrangement that includes aspects of both. FIGS. 7A through 14 also illustrate various combinations of inner tube, outer tube, washers, and end caps.

Shown in FIG. 7A is a seventh embodiment of a muffler formed in accordance with the present invention. The exhaust passage 16 includes a main section 104 with a shoulder 106 delineating the main section from the remaining upstream passage portions. The muffler 30 includes an inner tube 32 having a plurality of holes 42 and an outer tube 34 with a number of airflow openings 35. In the embodiment of FIG. 7A the openings 35 are longitudinal slits. Other shapes, sizes, and locations of openings may be used. The combination of the inner tube and outer tube are located within the main section, but are spaced apart from the main section walls to provide passage 98. A cutoff wall 108 is located below at least one inner tube hole. In the embodiment of FIG. 7A, the cutoff wall 106 is a lid attached to the lower end of the outer tube 34. The cutoff wall forces exhaust air to exit the inner tube holes during use.

Referring to FIG. 7B, a number of dividers 110 are fixedly and spacedly positioned about the inner tube 32. Each divider 110 extends outward from the inner tube exterior surface to meet the interior surface of the outer tube. The dividers of FIG. 7B are integrally formed with the inner tube 32. As shown best in FIG. 7D, the inner tube has a non-uniform diameter, particularly a shape tapered smaller in the direction of the inner tube distal end. An end cap 112 attaches to the handle for closing off the exhaust passage. The end cap includes a bulbous surface 114 having a number of exit openings 116. See also FIG. 7E. Referring back to FIG. 7C, the outer tube includes a longitudinal fin 118 and extension member 120 near the outer tube lower end. When the muffler is inserted into the exhaust passage main section, the fin inserts into a corresponding slot 122 formed in the handle. The inserted fin keeps the muffler from rotating. Likewise, the extension member contacts the end cap 112 to keep the muffler from translating.

As shown best in FIG. 7A, during hand tool use, exhaust air enters the inner tube proximal end, flows out the inner tube holes, moves around the number of dividers by flowing out the outer tube airflow openings, flows down the passage 98 and out the exit openings in the end cap. The tortuous movement of the exhaust air slows it and assists in dampening any attendant noise.

Shown in FIG. 8 is an eighth embodiment of a muffler formed in accordance with the present invention. The muffler includes an inner tube 32 having a plurality of holes 42 and a number of washers 36 stacked about the inner tube 32. Individual dividers 110 are located between the washers 36. Each divider 110 includes an inner diameter sized to contact the inner tube and an outer diameter sized to contact the interior surface of the outer sleeve 34. The inner tube 32 is open at its proximal end 38 and closed at its distal end 40. The inner tube 32 and washers 36 are held within an outer tube 34 located within the main section 104 of the exhaust passage. The outer tube 34 includes a number of airflow openings. As in the embodiment of FIG. 7A, the outer tube is sized smaller than the main section so that passage 98 is available for exhaust air flow.

The outer tube 34 shown in FIG. 8 is a rigid member formed of a lightweight plastic and having a plurality of holes positioned along the entire outer tube length. Other arrangements are possible. As before, what is important to the present invention is that the combination of components provide sufficient filtering and noise dampening without disrupting efficient operation of the tool. An end cap (such as the end cap 100 shown in FIG. 6B) is provided across the bottom of the handle 12. The end cap 100 includes a number of openings 102 which in the embodiment of FIG. 8 are at locations outward of the outer tube 34.

In the embodiment of FIG. 8, a cutoff wall (not shown) is located at the distal end of the inner tube. During use, exhaust air is directed from the handle exhaust passage 16 into the open inner tube proximal end 38. The cutoff wall forces exhaust air to flow out the holes 42 of the inner tube and into the adjacent washers 36. The dividers 110 force the exhaust air to travel laterally through each washer. The exhaust air exits the muffler via the outer tube airflow openings. In this embodiment, the dividers 110 provide a barrier to prohibit exhaust air from moving vertically between washers. The exhaust air exits the handle via the end cap openings.

Shown in FIG. 9A is a ninth embodiment of a muffler formed in accordance with the present invention. The arrangement is similar to the embodiment of FIG. 8 except there is no outer tube. Instead, an upper plate 124 butts the inner tube 32 and washers 36 against the shoulder 106. A lower plate 126 closes out the lowermost washer. The lower plate 126 includes an extension member 120 that extends from the lower plate lower surface. An end cap 112 with various openings 116 (see FIG. 9B) closes out the butt end of the handle 12. As assembled, the extension member 120 pushes the inner tube and washers firmly against the shoulder 106 and further provides a way for exhaust air to reach the end cap. An absorptive liner 128 is positioned adjacent the inner surface of the end cap at a location over the openings 116.

Shown in FIG. 10 is a tenth embodiment of a muffler formed in accordance with the present invention. The arrangement is similar to the embodiments of FIGS. 8 except there is not extension member 120. Instead, the cutoff wall 108 is located longitudinally midway within the inner tube 32 and the inner tube distal end 40 is left open. An end cap 130 has a single opening 132 at the location of the inner tube distal end. This combination forces exhaust air out the portion of the inner above the cutoff wall and then back into the portion of the inner tube located below the cutoff wall. The exhaust air then continues out the opening of the end cap.

Shown in FIG. 11A illustrates an eleventh embodiment in which the washer is formed as a single tube of material. The end cap is similar to the one shown in FIG. 9B, and a lower plate 126 closes out the surface of the lowermost washer. The lower plate includes an opening 134 adjacent the location of the inner tube distal end 40. The lower plate also includes a number of channels 136 formed on the lower plate surface that is adjacent the end cap. The channels 136 direct exhaust airflow to the end cap openings during use.

Shown in FIGS. 12 and 13 are yet further alternative embodiments of the present invention, whereby exhaust air is made to move into the inner tube prior to exiting the tool. In FIG. 12, an upper plate 124 completely closes off the inner tube proximal end. A number of tabs 140 hold the upper plate away from the main section shoulder 106 so that exhaust air can move around the upper plate. The exhaust air then moves through washers 36 into the inner tube via the inner tube holes 42. The end cap 130 is similar to that shown in FIG. 10. The arrangement of FIG. 13 is similar to the arrangement of FIG. 12, except in FIG. 13 an outer tube 34 is included as well as multiple dividers 110.

Figure 14:
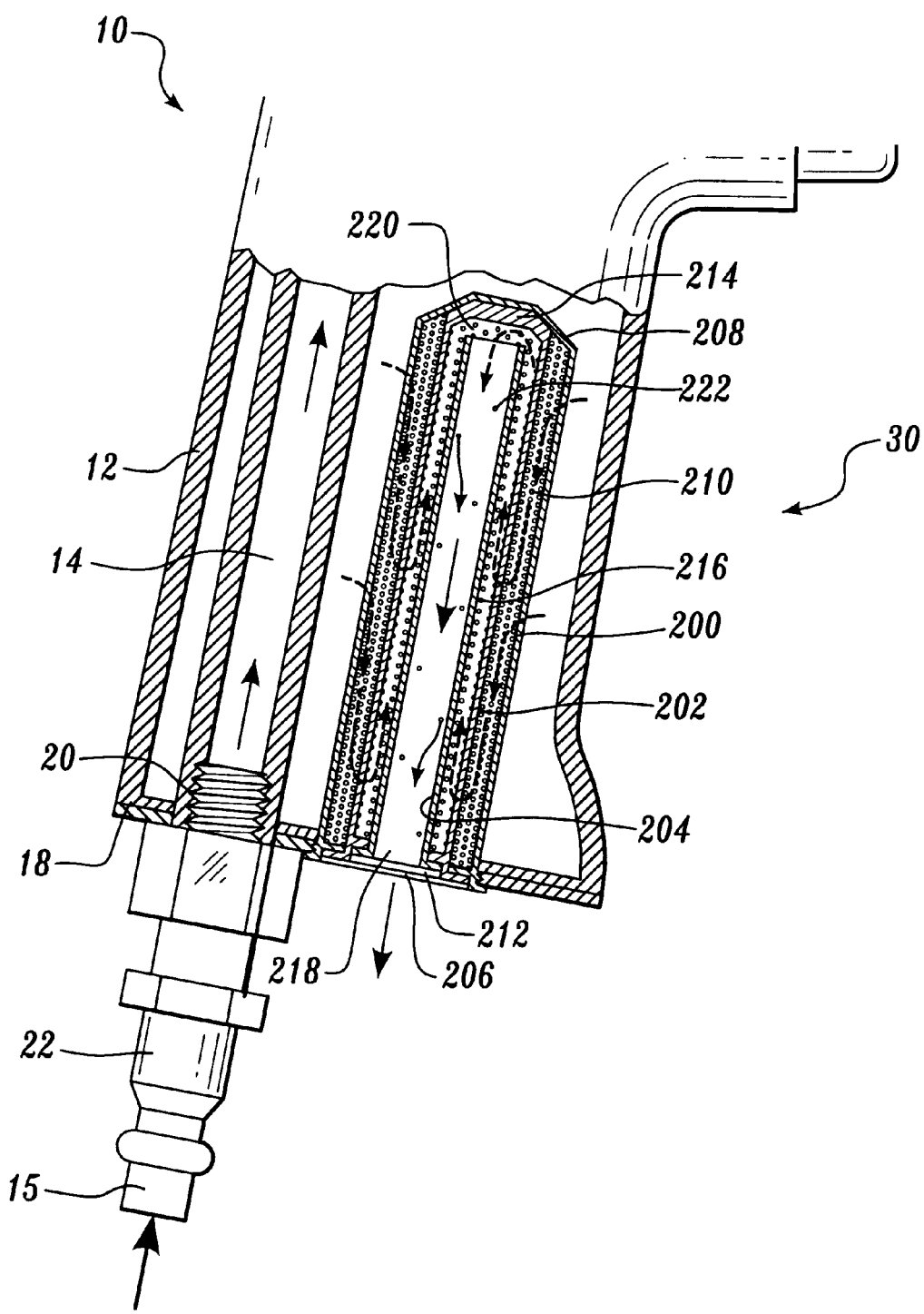
FIG. 14 is a partial cross-sectional side view of a fourteenth embodiment of a muffler formed in accordance with the present invention.

Shown in FIG. 14 is a fourteenth embodiment of a muffler formed in accordance with the present invention. The arrangement includes three inserts—a first insert 200, a second insert 202, and a third insert 204. The first insert 200 includes an open distal end 206, a closed proximal end 208, and a number of openings 210. The second insert 202 includes an open distal end 212, a closed proximal end 214, and a number of openings 216. The third insert 204 includes an open distal end 218 and an open proximal end 220. The third insert 204 may optionally include a number of holes 222. The third insert 204 is positioned within the second insert 202, with the third insert open distal end 218 seating in the second insert open distal end. The combination is positioned within the first insert 200, with the second insert open distal end 212 seating in the first insert open distal end 206. The first insert open distal end 206 seats in an opening formed in the handle end.

The various insert holes are sized and arranged to cause the exhaust to flow through the first insert holes, through the second insert holes, and finally out the third insert open distal end 218. In the embodiment of FIG. 14, there is a gradation of the number of openings 210 in the first insert 200 to allow more exhaust air to enter the first insert at locations nearer to its proximal end 208. A gradation in the number of openings 216 in the second insert 202 is provided in an opposite manner, i.e., to allow more exhaust air to enter the second insert at locations nearer to its distal end 212. Finally, the proximal end 220 of the third insert 204 is positioned away from the second insert proximal end 214 so that the third insert proximal end does not contact the second insert proximal end. This spaced apart arrangement allows exhaust air to also flow from the second insert directly into the third insert proximal end and then out the third insert open distal end 218. The tenth embodiment thus creates a labyrinth path for exhaust air to travel in exiting the hand tool, thereby slowing the exhaust and reducing its associated noise.

As will be appreciated from a reading of the above, the present invention is a compact, lightweight, and easy to use device capable of effectively quieting exhaust expelled from a pneumatic hand tool while causing minimal amounts of back pressure on the pneumatic motor. The present invention may be attached to known hand tools with only minor changes required to the hand tool.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a pneumatic hand tool having a handle with an exhaust passage including a main section, a muffler improvement comprising:
   (a) an inner tube having a plurality of holes, the inner tube having distal and proximal end;
   (b) a cutoff wall located within the inner tube at a location between the inner tube proximal and distal ends, at least one hole being provided in the inner tube above the cutoff wall and at least one hole being provided in the inner tube below the cutoff wall;
   (c) an upper plate connected to the inner tube proximal end; the upper plate closing off the exhaust passage main section such that at least portions of the exhaust air is directed into the inner tube proximal end during use;
   (d) an end cap attachable to the handle for closing off the exhaust passage, the end cap having an exit opening adjacent to the inner tube distal end;
   wherein during hand tool use, exhaust air enters the inner tube proximal end, flows out the inner tube holes located above the cutoff wall, moves around the cutoff wall, moves back into the inner tube holes located below the cutoff wall, and flows out the exit opening of the end cap; whereby the tortuous path of the exhaust air slows it and assists in dampening exhaust noise.

2. The muffler according to claim 1, wherein the cutoff wall is located approximately midway along the longitude of the inner tube.

3. The muffler according to claim 1, wherein the inner tube is formed of at least one of a hard elastomer, aluminum rigid paper, and rigid cloth.

4. The muffler according to claim 1, wherein the inner tube and cutoff wall are intregally formed.

5. The muffler according to claim 1, wherein there are a number of holes along the inner tube both above and below the location of the cutoff wall.

6. The muffler according to claim 1, wherein the main section includes an upper shoulder, the upper plate being formed to contact the upper shoulder to force all exhaust air into the inner tube proximal end during use.

7. The muffler according to claim 1, further comprising a number of porous washers positioned about the inner tube.

8. The muffler according to claim 7, wherein the number of washers are formed from a material in the group comprising felt, gauze, rubber, foam, and synthetic fiber.

9. The muffler according to claim 7, further comprising an outer tube positioned about the combination of the inner tube and washers; the outer tube including a number of airflow openings; the outer tube being sized to provide a passageway between itself and the wall surfaces of the main section.

10. The muffler according to claim 7, further comprising a number of dividers fixedly and spacedly positioned about the inner tube, each divider extending outward from the inner tube exterior surface a distance less than the width of the main section.

11. The muffler according to claim 10, further comprising a number of porous washers positioned about the inner tube between dividers.

12. The muffler according to claim 10, further comprising an outer tube positioned about the combination of the inner tube and dividers; the outer tube including a number of airflow openings; the outer tube being sized to provide a passageway between itself and the wall surfaces of the main section.

13. In a pneumatic hand tool having a handle with an exhaust passage including a main section, a muffler improvement comprising:

(a) an inner tube having a plurality of holes, the inner tube having distal and proximal ends and an exterior surface;

(b) a cutoff wall located below at least one hole of the inner tube, the cutoff wall forcing exhaust air to exit the inner tube via the at least one hole thereabove;

(c) a number of dividers fixedly and spacedly positioned about the inner tube, each divider extending outward from the inner tube exterior surface a distance less than the width of the main section, the combination of the inner tube and dividers being located within the main section; and (d) an end cap attachable to the handle for closing off the exhaust passage, at least one of the end cap and the handle including an exit opening;

wherein during hand tool use, exhaust air enters the inner tube proximal end, flows out the inner tube holes, moves around the number of dividers, and flows out the exit opening; the tortuous movement of the exhaust air slowing it and assisting in dampening any attendant noise.

* * * * *

UNITED STATES PATENT AND TRADEMARK OFFICE
CERTIFICATE OF CORRECTION

PATENT NO.    : 6,209,678 B1
DATED         : April 3, 2001
INVENTOR(S)   : R.E. Sterling It is certified that error appears in the above-identified patent and that said Letters Patent is hereby corrected as shown below:

Title page,
Item [56], References Cited, "Fattleay" should read -- Fattelay --.
Item [63], Related U.S. Application Data, insert in appropriate order the following:
-- [63] Related U.S. Application Data
Continuation-in-part of application No. 09/316,451,
filed on May 21, 1999; which is a continuation of
application No. 09/082,293, filed on May 19, 1998 now
U.S. Pat. No. 5,909,016; which is a continuation-in-
part of application No. 08/999,588, filed Jan. 13, 1998,
now U.S. Pat. No. 5,952,623. --

Column 10,
Line 46, "aluminum" should read -- aluminum, --

Signed and Sealed this

Eighteenth Day of December, 2001

*Attest:*

*Attesting Officer*

JAMES E. ROGAN
*Director of the United States Patent and Trademark Office*